United States Patent
Kim et al.

(10) Patent No.: US 12,397,768 B2
(45) Date of Patent: Aug. 26, 2025

(54) VEHICLE BRAKE SYSTEM

(71) Applicant: HL MANDO CORPORATION, Gyeonggi-do (KR)

(72) Inventors: Seo Hyoung Kim, Gyeonggi-do (KR); Sang Woo Kim, Gyeonggi-do (KR); Mo Ran Yang, Gyeonggi-do (KR); Sang Won Bae, Gyeonggi-do (KR); You Ri Jung, Gyeonggi-do (KR); Sun Joo Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 167 days.

(21) Appl. No.: 18/027,101

(22) PCT Filed: Sep. 24, 2021

(86) PCT No.: PCT/KR2021/013051
§ 371 (c)(1),
(2) Date: Mar. 18, 2023

(87) PCT Pub. No.: WO2022/065920
PCT Pub. Date: Mar. 31, 2022

(65) Prior Publication Data
US 2023/0331209 A1    Oct. 19, 2023

(30) Foreign Application Priority Data

Sep. 25, 2020   (KR) .................. 10-2020-0124823
Sep. 25, 2020   (KR) .................. 10-2020-0124824
(Continued)

(51) Int. Cl.
*B60T 17/22*       (2006.01)

(52) U.S. Cl.
CPC ........... *B60T 17/22* (2013.01); *B60T 2220/04* (2013.01); *B60T 2270/00* (2013.01)

(58) Field of Classification Search
CPC .. B60T 1/10; B60T 3/586; B60T 7/042; B60T 8/00; B60T 8/172; B60T 8/3255;
(Continued)

(56) References Cited

U.S. PATENT DOCUMENTS

2006/0219048 A1 * 10/2006 Ueno .................. B60T 7/042
                                                                74/560
2006/0284481 A1 * 12/2006 Yone .................. B60T 7/042
                                                               303/155
(Continued)

FOREIGN PATENT DOCUMENTS

JP    2010-271298    12/2010
JP    2015-042526     3/2015
(Continued)

OTHER PUBLICATIONS

International Search Report for PCT/KR2021/013051 mailed on Jan. 3, 2022 and its English Machine Translation by the WIPO (now published as WO 2022/065920).
(Continued)

*Primary Examiner* — Hai H Huynh
*Assistant Examiner* — Johnny H Hoang
(74) *Attorney, Agent, or Firm* — WOMBLE BOND DICKINSON (US) LLP

(57) ABSTRACT

Disclosed a vehicle brake system in which the structure required when transmitting a wake-up signal in response to a pedal input can be further simplified, the vehicle brake system comprising: a pedal travel sensor (PTS) which senses whether pressure is being applied to the pedal and the amount of pressure being applied; and a wake recognition circuit which is connected to the PTS such that electricity can flow directly in both directions, and which receives a signal from the PTS and wakes up an electronic control unit (ETU), wherein the PTS delivers the output signal to the
(Continued)

wake recognition circuit if the output signal is at least a preset value.

15 Claims, 11 Drawing Sheets

(30) Foreign Application Priority Data

Sep. 25, 2020 (KR) .......................... 10-2020-0124826
Sep. 25, 2020 (KR) .......................... 10/2020/0124827
Mar. 29, 2021 (KR) .......................... 10-2021-0040524

(58) Field of Classification Search
CPC .... B60T 13/586; B60T 17/22; B60T 2220/04; B60T 2270/00; B60T 2270/06; B60W 10/18; B60W 30/18127; B60W 40/105; B60W 60/0001; B60Q 1/0076; B60Q 1/44; B60Q 1/441; B60Q 1/444; F16D 61/00
USPC ........................................ 701/70, 71, 76, 77
See application file for complete search history.

(56) References Cited

U.S. PATENT DOCUMENTS

| 2007/0112473 | A1 | 5/2007 | Ueno et al. | |
| 2008/0306667 | A1* | 12/2008 | Karnjate | B60T 7/042 303/121 |
| 2014/0368027 | A1* | 12/2014 | Bohm | B60T 8/4081 303/14 |
| 2019/0263382 | A1* | 8/2019 | Parsels | B60W 30/20 |
| 2022/0185245 | A1* | 6/2022 | Gabara | B60T 7/122 |

FOREIGN PATENT DOCUMENTS

| JP | 2016-011833 | 1/2016 |
| KR | 10-1536196 | 11/2015 |
| KR | 10-2016-0032659 | 3/2016 |
| KR | 10-1904710 | 10/2018 |

OTHER PUBLICATIONS

Written Opinion of the International Searching Authority for PCT/KR2021/013051 mailed on Jan. 3, 2022 and its English Machine Translation by the WIPO (now published as WO 2022/065920).

* cited by examiner (a)

(b)

(a)

(b)

VEHICLE BRAKE SYSTEM

CROSS-REFERENCE TO RELATED APPLICATIONS

This application is the U.S. National Stage of International Patent Application No. PCT/KR2021/013051 filed on Sep. 24, 2021, which claims priority to and the benefit of Korean Patent Application No. 10-2020-0124823, filed on Sep. 25, 2020, Korean Patent Application No. 10-2020-0124826, filed on Sep. 25, 2020, Korean Patent Application No. 10-2020-0124827, filed on Sep. 25, 2020, Korean Patent Application No. 10-2020-0124824, filed on Sep. 25, 2020, and Korean Patent 10 Application No. 10-2021-0040524, filed on Mar. 29, 2021, the disclosures of which are incorporated herein by reference in their entirety.

TECHNICAL FIELD

The present disclosure relates to a vehicle brake system, and more specifically to a vehicle brake system in which the structure required when transmitting a wake-up signal in response to a pedal input can be further simplified.

BACKGROUND ART

The vehicle braking system refers to a system for decelerating or stopping the speed of a driving vehicle. A typical vehicle braking system may be connected to a pedal, and driven based on whether and how much the pedal is pressed.

The conventional vehicle braking system senses whether pressure is being applied to the pedal and the amount of pressure being applied by a pedal travel sensor (PTS), and an electronic control unit (ECU) receives an output signal from the PTS to brake the vehicle.

In addition, the pedal may be connected to a separate circuit that is independent of the PTS and outputs a signal to the ECU requiring a wake-up signal by recognizing the application of the pedal. Accordingly, when the pedal is applied, a wake-up signal may be transmitted to the ECU of the vehicle braking system, and the ECU may be automatically started.

However, this type of vehicle braking system requires a separate wiring for transmission/reception of a wake-up signal between the pedal and the ECU. That is, in addition to the existing circuit, additional installation of wiring between the pedal and the ECU is required. This may increase the overall weight of the vehicle braking system, which further increases the manufacturing cost.

Accordingly, there will be a need to develop a vehicle braking system in which the structure required when transmitting a wake-up signal in response to a pedal input can be further simplified.

Korean Registered Patent No. 10-1904710 discloses a braking control method of a smart booster for a vehicle. Specifically, the braking control method in which minimum power is supplied to an ECU of a vehicle braking system when a pedal is applied is disclosed.

However, in this type of braking control method, since the wake-up signal transmission circuit according to a pedal input is formed independently of the PTS, transmission/reception wiring between the pedal and the ECU is additionally required.

Korean Patent Application Laid-Open No. 10-2016-0032659 discloses a wake-up system of a wake-up packet. Specifically, the wake-up system for generating a wake-up signal by receiving a signal from a pedal is disclosed.

However, this type of wake-up system does not disclose a specific coupling relationship between the pedal and the wake-up system. Furthermore, the coupling relationship between the ECU or PTS of the vehicle braking system and the wake-up system is not disclosed.

(Related Art Document 1) Korean Registered Patent No. 10-1904710 (Oct. 15, 2018)
(Related Art Document 2) Korean Patent Application Laid-Open No. 10-2016-0032659 (Mar. 24, 2016)

DISCLOSURE

Technical Problem

An object of the present disclosure is to provide a vehicle braking system in which the structure required when transmitting a wake-up signal in response to a pedal input can be further simplified.

Another object of the present disclosure is to provide a vehicle braking system in which standby power can be further reduced.

Still another object of the present disclosure is to provide a vehicle braking system in which the manufacturing cost can be further reduced.

Technical Solution

In order to achieve the above objects, the vehicle brake system according to an exemplary embodiment of the present disclosure includes a pedal travel sensor (PTS) which senses whether pressure is being applied to the pedal and the amount of pressure being applied; and a wake recognition circuit which is connected to the PTS such that electricity can flow directly in both directions, and which receives a signal from the PTS and wakes up an electronic control unit (ETU), wherein the PTS delivers the output signal to the wake recognition circuit if the output signal is at least a preset value.

In addition, the PTS may transmit the output signal to the wake recognition circuit, maintain the output signal for a preset time and transmit the output signal to the wake recognition circuit.

In addition, the wake recognition circuit may be operated at all times by power.

In addition, the PTS may be directly interconnected with the pedal.

In addition, the PTS may be provided with a press switch for sensing whether pressure is being applied to the pedal and the amount of pressure being applied by coming into contact with the pedal, when the pedal is pressed and rotated.

In addition, the PTS may be connected to the power of the ECU such that electricity can flow directly in both directions so as to receive power at all times.

In addition, the PTS may be connected to a regulator of the ECU such that electricity can flow directly in both directions, and transmit the output signal to the regulator, if the output signal is at least a preset value, and wherein the regulator may wake up by receiving the output signal.

In addition, the PTS may include a printed circuit board (PCB); a magnet whose magnetic strength is changed as the pedal is pressed; a sensor circuit disposed on one surface of the PCT and configured to sense whether pressure is being applied to the pedal and the amount of pressure being applied based on a change in the magnetic strength; and a switch circuit for outputting a signal to the wake recognition circuit, if the change in magnetic strength is at least a preset change amount.

In addition, the switch circuit may be connected to a separate battery independent of the power of the ECU such that electricity can flow directly in both directions so as to receiver power at all times.

In addition, the wake recognition circuit may be built in a central electronic module (CEM) independent of the ECU, and wherein the ECU may supply power to the PTS, when the wake recognition circuit receives the output signal from the PTS.

In addition, the switch circuit may be disposed on the one surface of the PCB.

In addition, the switch circuit may be disposed on the other surface opposite to the one surface of the PCB.

In addition, the PTS may be spaced apart from the pedal.

In addition, the PTS may include a printed circuit board (PCB); a magnet whose magnetic strength is changed as the pedal is pressed; a sensor circuit disposed on one surface of the PCT and configured to sense whether pressure is being applied to the pedal and the amount of pressure being applied based on a change in the magnetic strength; and a switch circuit for outputting a signal to the wake recognition circuit, if the change in magnetic strength is at least a preset change amount.

In addition, the output signal of the PTS may be a pulse width modulation (PWM) signal, and wherein the wake recognition circuit may include a supervisor circuit for monitoring the PWM signal, and transmitting the PWM signal to the wake recognition circuit, when the PWM signal reaches a preset value.

Advantageous Effects

Among the various effects of the present disclosure, effects that can be obtained through the above-described technical solution are as follows.

First, the vehicle braking system includes a pedal travel sensor (PTS) for sensing whether pressure is being applied to the pedal and the amount of pressure being applied, and a wake recognition circuit which is connected to the PTS such that electricity can flow directly in both directions, and receives a signal from the PTS to wake up the electronic control unit (ECU).

Accordingly, a wake-up signal is transmitted to the ECU when the pedal is applied without a separate circuit for recognizing a pedal input such that the ECU can be automatically started. Accordingly, a separate wiring for transmitting and receiving a wake-up signal between the pedal and the ECU is not required. As a result, the overall weight of the vehicle braking system can be reduced, and the structure can be further simplified. Furthermore, the spatial freedom inside the vehicle braking system can also be improved.

In addition, the PTS includes a switch circuit that outputs a signal to the wake recognition circuit when the pedal is applied. The switch circuit is connected to a separate battery independent of the ECU's power supply such that electricity can flow directly in both directions so as to receive power at all times.

The wake recognition circuit is built in a central electronic module (CEM) independent of the ECU, and receives a wake-up signal from the PTS and sends it to the ECU. The ECU receives the wake-up signal from the CEM and supplies power to the PTS.

Therefore, when the vehicle is in an OFF state, that is, in a parking state, the wake-up operation may be performed by a separate battery, and ECU power is not required. Accordingly, the standby power of the ECU can be further reduced. Furthermore, the efficiency of the ECU can be further improved.

In addition, the switch circuit senses whether pressure is applied to the pedal based on the magnetic strength of a magnet provided in the existing PTS. That is, the switch circuit senses whether pressure is being applied to the pedal by using a magnet provided in the existing PTS.

Accordingly, the cost required for structural replacement of the existing PTS can be further reduced. Furthermore, the manufacturing cost of the vehicle braking system can be further reduced.

MODES OF THE INVENTION

Figure 1:
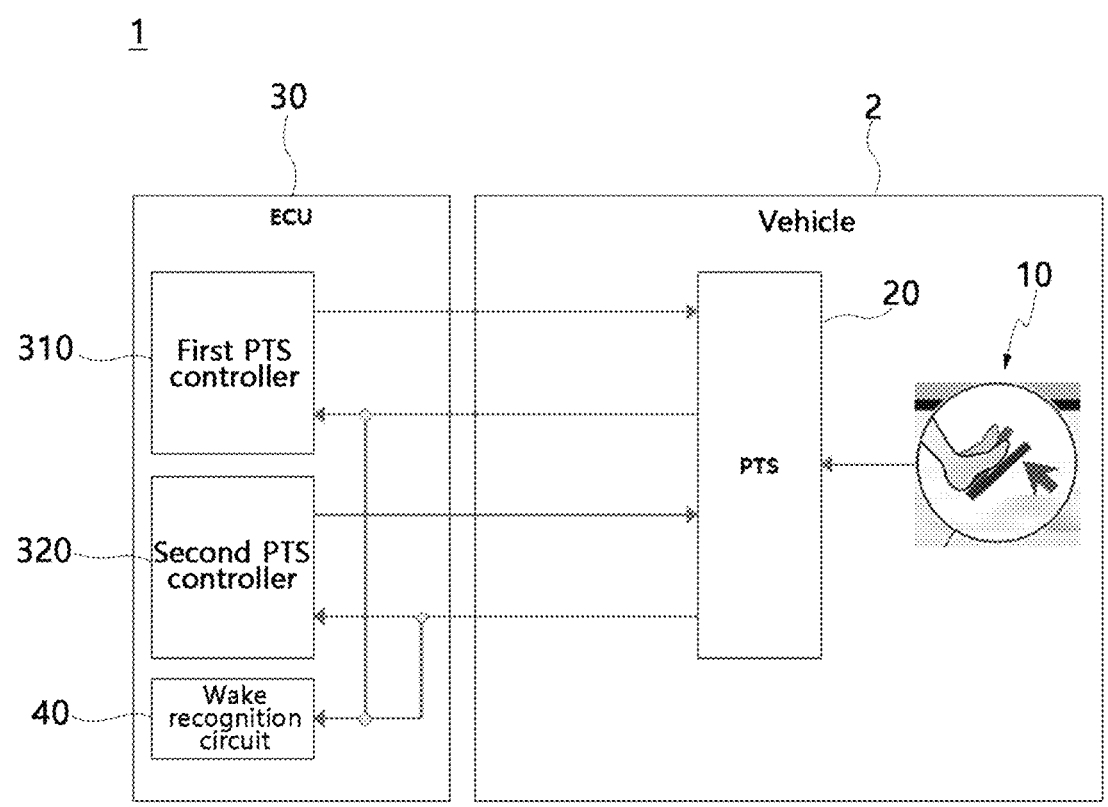
FIG. 1 is a conceptual diagram illustrating the vehicle braking system according to an exemplary embodiment of the present disclosure.

Hereinafter, the vehicle braking system 1 according to an exemplary embodiment of the present disclosure will be described in more detail with reference to the drawings.

In the following description, in order to clarify the characteristics of the present disclosure, the descriptions of some components may be omitted.

In the present specification, the same reference numerals are assigned to the same components even in different exemplary embodiments, and the overlapping descriptions thereof will be omitted.

The accompanying drawings are only for easy understanding of the exemplary embodiments disclosed in the present specification, and the technical ideas disclosed in the present specification are not limited by the accompanying drawings.

The singular expression includes the plural expression unless the context clearly dictates otherwise.

Hereinafter, the vehicle braking system 1 according to an exemplary embodiment of the present disclosure will be described with reference to FIGS. 1 to 5.

The vehicle braking system 1 refers to a system for decelerating or stopping the speed of the vehicle 2 in motion. The vehicle braking system 1 is connected to a pedal 10 and is driven based on whether pressure is applied to the pedal 10 and the amount of pressure being applied.

In addition, the vehicle braking system 1 may be automatically started by generating a wake-up signal when the pedal 10 is applied.

The vehicle braking system 1 according to the present exemplary embodiment includes a pedal 10, a pedal travel sensor (PTS) 20, an electronic control unit (ECU) 30, a wake recognition circuit 40 and a battery 50.

The pedal 10 is applied by the user and serves to generate a driving signal to the vehicle braking system 1.

The pedal 10 controls the driving and stopping of the vehicle braking system 1 according to whether it is applied. In addition, the braking force of the vehicle 2 may be determined according to the degree of application of the pedal 10.

The PTS senses whether the pedal 10 is applied and the degree of application.

The pedal travel sensor (PTS) 20 senses whether pressure is being applied to the pedal and the amount of pressure being applied, and transmits an output result based on the sensing result to the wake recognition circuit 40 to be described below.

The PTS 20 may be classified into an external type or a built-in type depending on whether the PTS 20 is directly coupled to the pedal 10. In the exemplary embodiment illustrated in FIG. 1, the PTS 20 is formed as an external PTS 20 that is directly coupled to the pedal 10.

However, the PTS 20 transmits the output signal to the wake recognition circuit 40 if the output signal is at least a preset value, and does not transmit it to the wake recognition circuit 40 if the output signal is less than a preset value. The detailed description thereof will be provided below.

A plurality of PTSs 20 may be provided. In an exemplary embodiment, the PTS 20 may be provided with a total of two, including a PDT channel and a PDF channel.

The PTS 20 includes a circuit for receiving power from the ECU 30 and a circuit for transmitting an output signal according to the sensing result to the ECU 30.

The electronic control unit (ECU) 30 is in charge of controlling the driving state of the vehicle braking system 1.

The ECU 30 is electrically connected to the PTS 20. The ECU 30 includes a circuit for supplying power to the PTS 20 and a circuit for receiving an output signal according to the sensing result of the PTS 20.

In the illustrated exemplary embodiment, the ECU 30 includes a first PTS controller 310 and a second PTS controller 320.

The first PTS controller 310 and the second PTS controller 320 are respectively connected to different PTSs 20 such that electricity can flow in both directions. In an exemplary embodiment, the first PTS controller 310 and the second PTS controller 320 may be connected to each other with the PTS 20 formed of different channels such that electricity can flow in both directions.

The first PTS controller 310 and the second PTS controller 320 receive output signals sensed from the connected PTS 20, respectively, and supply power to the connected PTS 20.

In the illustrated exemplary embodiment, the circuits transmitted from the PTS 20 to the ECU 30 are connected to the wake recognition circuit 40, respectively, such that electricity can flow in both directions.

The wake recognition circuit 40 is a recognition circuit for generating a wake-up signal to the ECU 30.

The wake recognition circuit 40 is connected to the PTS 20 such that electricity can directly flow in both directions. In addition, the wake recognition circuit 40 receives an output signal of the PTS 20 and outputs it to the outside.

Accordingly, a wake-up signal is transmitted to the ECU 30 when the pedal 10 is applied without a separate circuit for recognizing the application of the pedal 10 such so that the ECU 30 may be automatically started. Accordingly, a separate wiring for transmission and reception of a wake-up signal between the pedal 10 and the ECU 30 is not required. As a result, the overall weight of the vehicle braking system 1 may be reduced and the structure may be further simplified. Furthermore, the spatial freedom inside the vehicle braking system 1 may also be improved.

In the illustrated exemplary embodiment, the wake recognition circuit 40 is formed inside the ECU 30. However, the wake recognition circuit 40 is not limited to the above exemplary embodiment, and may be formed in various structures connected to the PTS 20 such that electricity can directly flow in both directions.

In the illustrated exemplary embodiment, the wake recognition circuit 40 is connected to a circuit for transmitting an output signal of the PTS 20 to the first PTS control unit 310, and a circuit for transmitting it to the second PTS control unit 320, respectively.

However, the structure of the wake recognition circuit 40 is not limited to the illustrated exemplary embodiment, and may be formed in various structures capable of being connected to the PTS 20 such that electricity can directly flow in both directions. For example, the wake recognition circuit 40 may be connected to any one of a circuit for transmitting an output signal of the PTS 20 to the first PTS control unit 310 and a circuit for transmitting it to the second PTS control unit 320.

Hereinafter, the output of the wake recognition circuit 40 according to the output result of the PTS 20 will be described with reference to FIG. 2.

Figure 2:
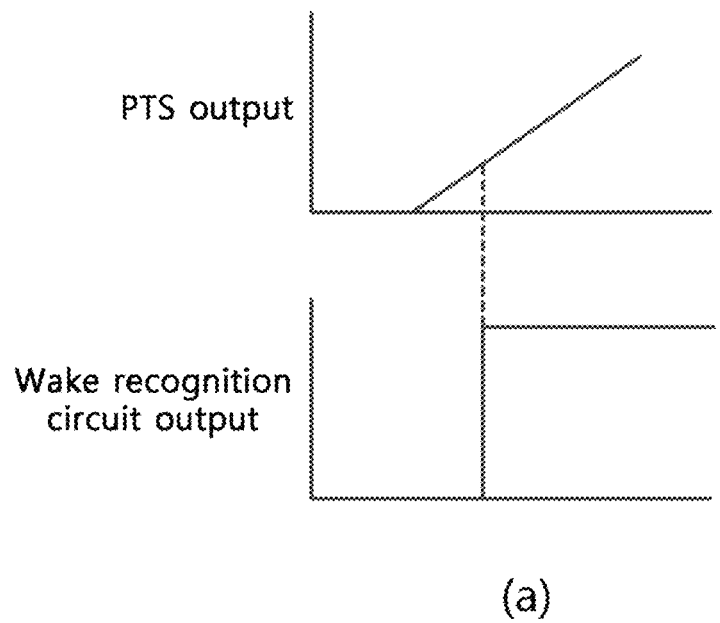
FIG. 2 is a conceptual diagram illustrating output results of a PTS and wake recognition circuit provided in the vehicle braking system of FIG. 1.
Figure 2:
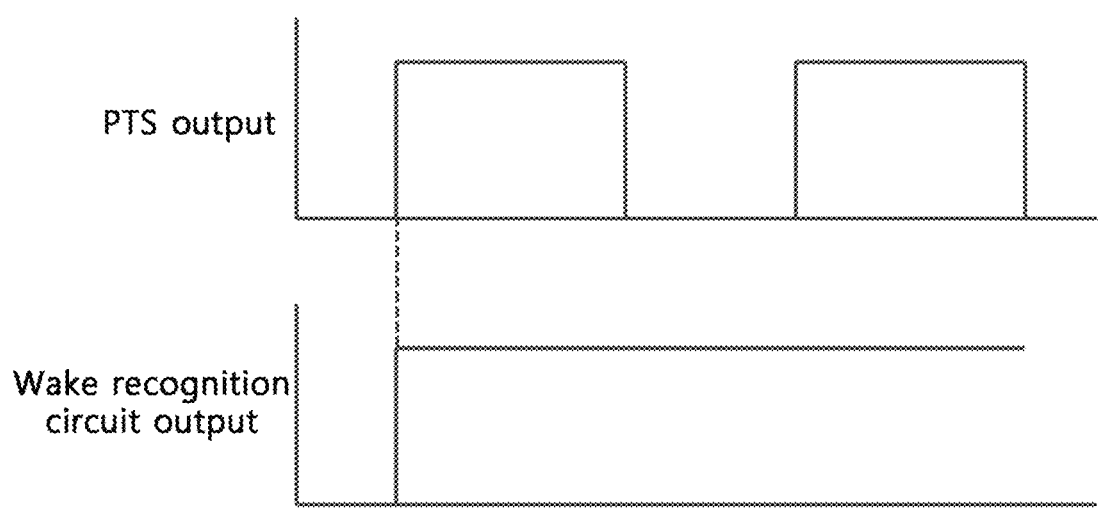

FIGS. 2(*a*) and 2(*b*) illustrate the outputs of the PTS 20 and the wake recognition circuit 40 according to analog and digital signals, respectively.

As described above, when the output signal of the PTS 20 is at least a preset value, the wake recognition circuit 40 receives the output signal and outputs it to the outside. This may be implemented by, for example, an edge trigger circuit provided between the PTS 20 and the wake recognition circuit 40.

When the output signal of the PTS 20 reaches a preset value, the output signal is maintained for a preset time and transmitted to the wake recognition circuit 40. This is to prevent a chattering phenomenon caused by a frequent wake-up signal.

Hereinafter, an exemplary embodiment of the external PTS 20 will be described with reference to FIG. 3.

Figure 3:
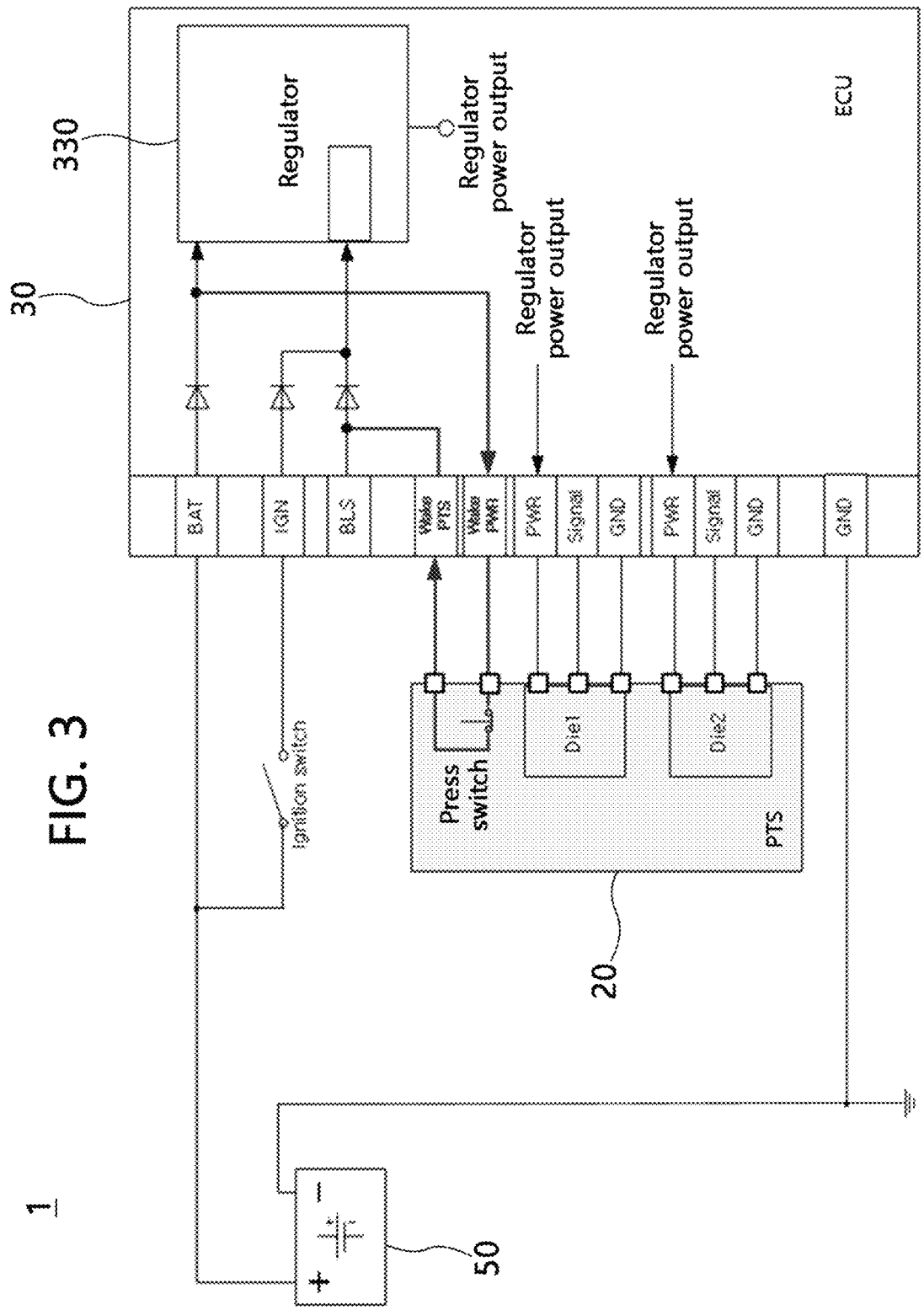
FIGS. 3 to 4 are conceptual diagrams illustrating the coupling relationship between a PTS, an ECU and a battery provided in the vehicle braking system of FIG. 1.

In the exemplary embodiment illustrated in FIG. 3, the PTS 20 is provided with a press switch that contacts the pedal 10 when the pedal 10 is pressed and rotates to sense whether pressure is being applied the pedal 10 and the amount of pressure being applied to the pedal.

The PTS 20 is connected to the battery 50 for supplying power to the ECU 30 such that electricity can directly flow in both directions, and receives power from the battery 50 at all times.

The ECU 30 includes a regulator 330.

The regulator 330 is directly connected to the PTS 20 such that electricity can flow in both directions, and receives a wake-up signal from the PTS 20 to output power. Specifically, when the output signal of the PTS 20 is at least a preset value, the PTS 20 receives a wake-up signal to output power.

In addition, the power output from the regulator 330 is supplied to the PTS 20.

Hereinafter, another exemplary embodiment of the external PTS 20 will be described with reference to FIGS. 4 to 5.

Figure 4:
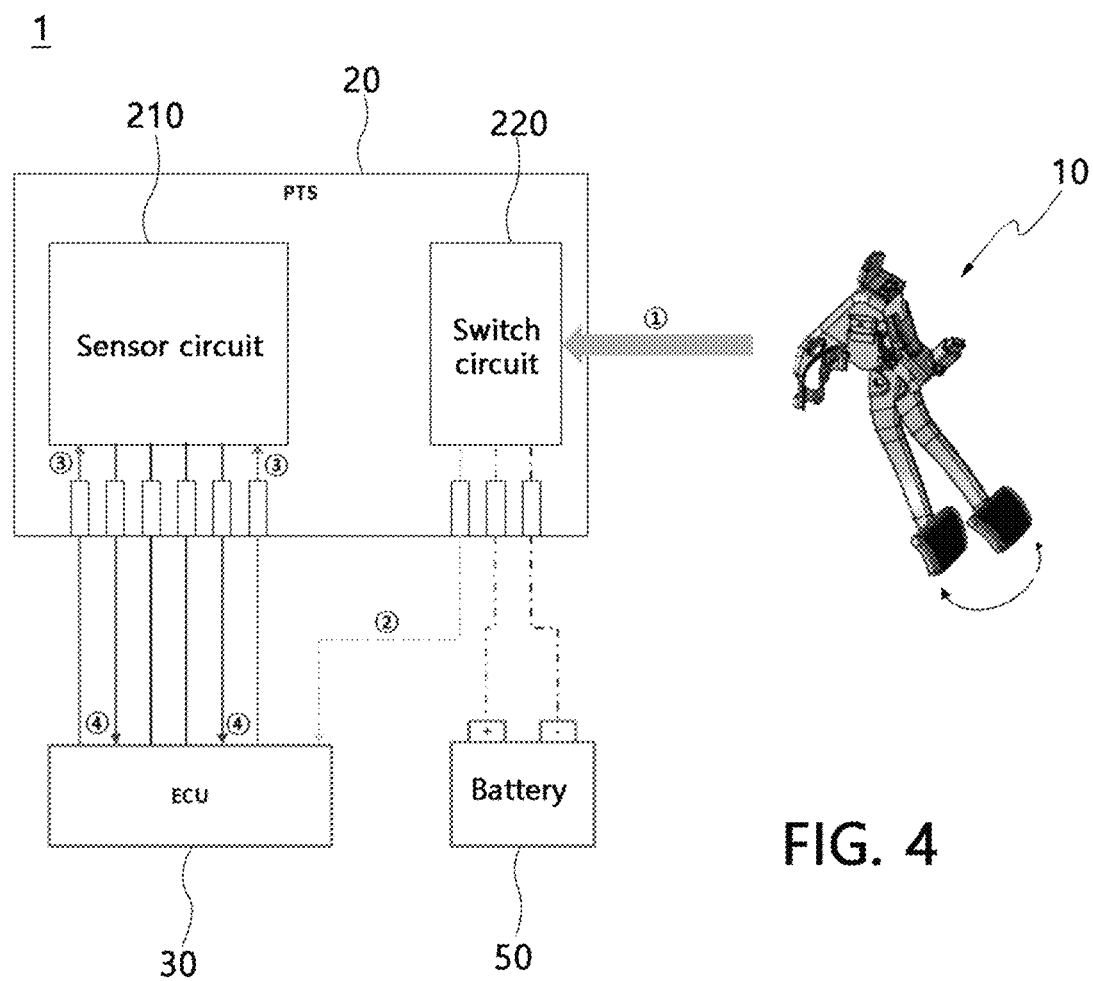
Figure 5:
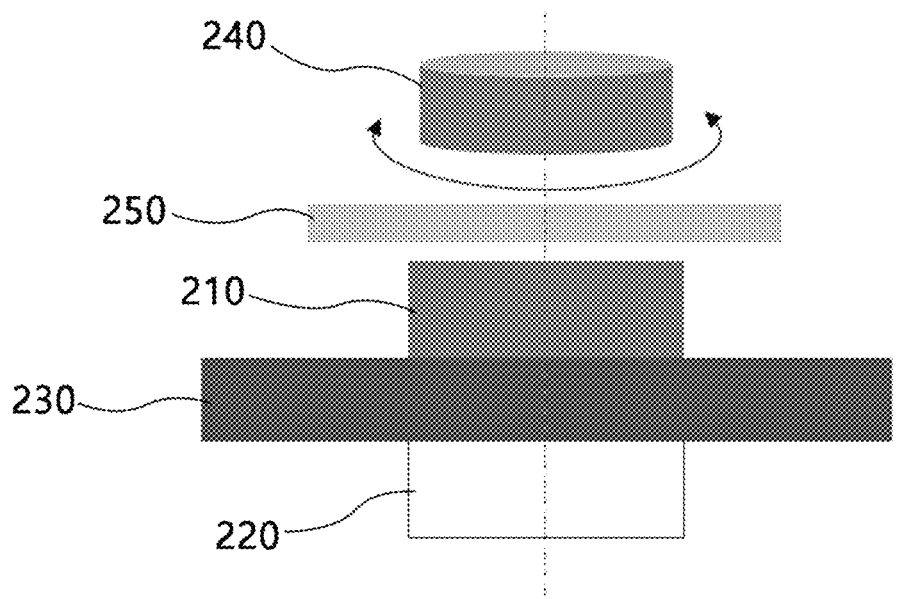
FIG. 5 is a conceptual diagram illustrating a PTS provided in the vehicle braking system of FIG. 1.
Figure 5:
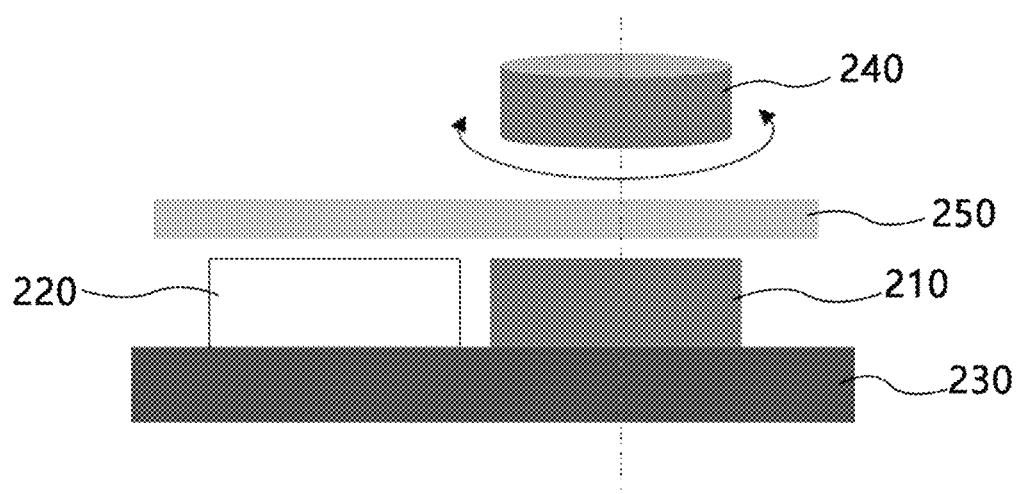

In the exemplary embodiment illustrated in FIGS. 4 to 5, the PTS 20 includes a sensor circuit 210, a switch circuit 220, a printed circuit board (PCB) 230, a magnet 240 and a magnetic flux concentration plate 250.

The sensor circuit 210 senses whether pressure is being applied to the pedal and the amount of pressure being applied through the magnet 240 to be described below. The magnet 240 is coupled to one end of the pedal 10, rotates together with the pedal 10 when pressure is applied to the pedal 10, and causes a change in magnetic strength. Accordingly, the sensor circuit 210 may sense whether pressure is being applied to the pedal and the amount of pressure being applied from the change in the magnetic strength of the magnet 240.

The switch circuit 220 outputs a signal to the wake recognition circuit 40 when the change in magnetic strength of the magnet 240 is at least a preset change amount. In this case, the switch circuit 220 measures a change in magnetic strength of the same magnet 240 as the sensor circuit 210. Accordingly, the cost required for structural replacement of the existing PTS 20 may be further reduced. Furthermore, the manufacturing cost of the vehicle braking system 1 may be further reduced.

In addition, the vehicle braking system 1 further includes a separate battery 50 independent of the power source of the ECU 30. The switch circuit 220 is connected to a separate battery 50 such that electricity can flow in both directions, and receives constant power therefrom.

A wake-up signal generation process of the ECU 30 when the pedal 10 is applied is as follows.

(1) When the pedal 10 is pressed in the ignition OFF state of the vehicle 2, the pedal 10 is rotated and the magnet 240 of the switch circuit 220 is rotated together. As the magnet 240 rotates, the magnetic strength in the switch circuit 220 changes. (2) The switch circuit 220 recognizes a change in magnetic strength of the magnet 240 and outputs a signal to the ECU 30. (3) Accordingly, a wake-up signal is generated in the ECU 30, and the ECU 30 supplies power to the PTS 20. (4) The PTS 20 supplied with power transmits operation and output signals to the ECU 30.

Hereinafter, various exemplary embodiments of the PTS 20 will be described in more detail with reference to FIG. 5.

In the illustrated exemplary embodiment, the sensor circuit 210 and the switch circuit 220 of the PTS 20 are disposed on a PCB 230.

The printed circuit board (PCB) 230 forms the basis of the sensor circuit 210 and the switch circuit 220. Positions of the sensor circuit 210 and the switch unit may be formed in various ways.

In the exemplary embodiment illustrated in FIG. 5a, the sensor circuit 210 and the switch circuit 220 may be disposed side by side on one surface of the PCB 230. In the exemplary embodiment illustrated in FIG. 5b, the sensor circuit 210 and the switch circuit 220 are disposed on one surface and the other surface of the PCB 230, respectively. That is, the sensor circuit 210 and the switch circuit 220 are disposed to face each other with the PCB 230 interposed therebetween.

The magnet 240 is disposed to be spaced apart from each other with the sensor circuit 210 and the switch unit circuit 220 and an air layer interposed therebetween.

The magnet 240 is installed at one end of the pedal 10, and rotates together with the pedal 10 when the pedal 10 is pressed and rotated. As the magnet 240 rotates, a change in magnetic strength is induced, and the sensor circuit 210 and the switch circuit 220 recognize the change in magnetic strength and output a signal to the ECU 30 or the wake recognition circuit 40.

In the illustrated exemplary embodiment, a magnetic flux concentration plate 250 is provided between the sensor circuit 210 and the switch circuit 220 and the magnet 240.

The magnetic flux concentration plate 250 serves to increase the precision of sensing by concentrating the magnetization direction of the magnet 240 to a specific area.

Accordingly, the sensor circuit 210 and the switch circuit 220 may recognize a change in magnetic strength without changing the size and shape of the existing magnet 240.

In an exemplary embodiment, the magnetic flux concentration plate 250 may be formed of a metal material.

Figure 6:
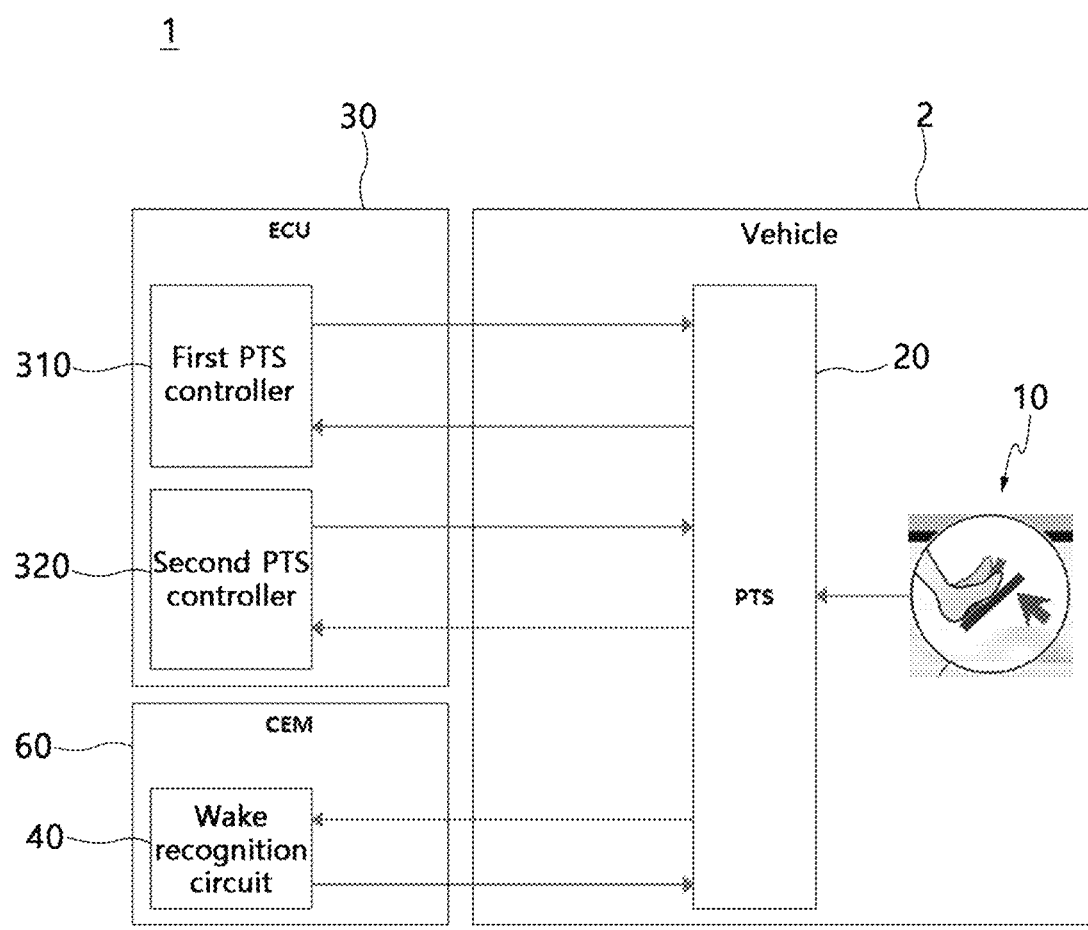
FIG. 6 is a conceptual diagram illustrating the vehicle braking system according to another exemplary embodiment of the present disclosure.
Figure 7:
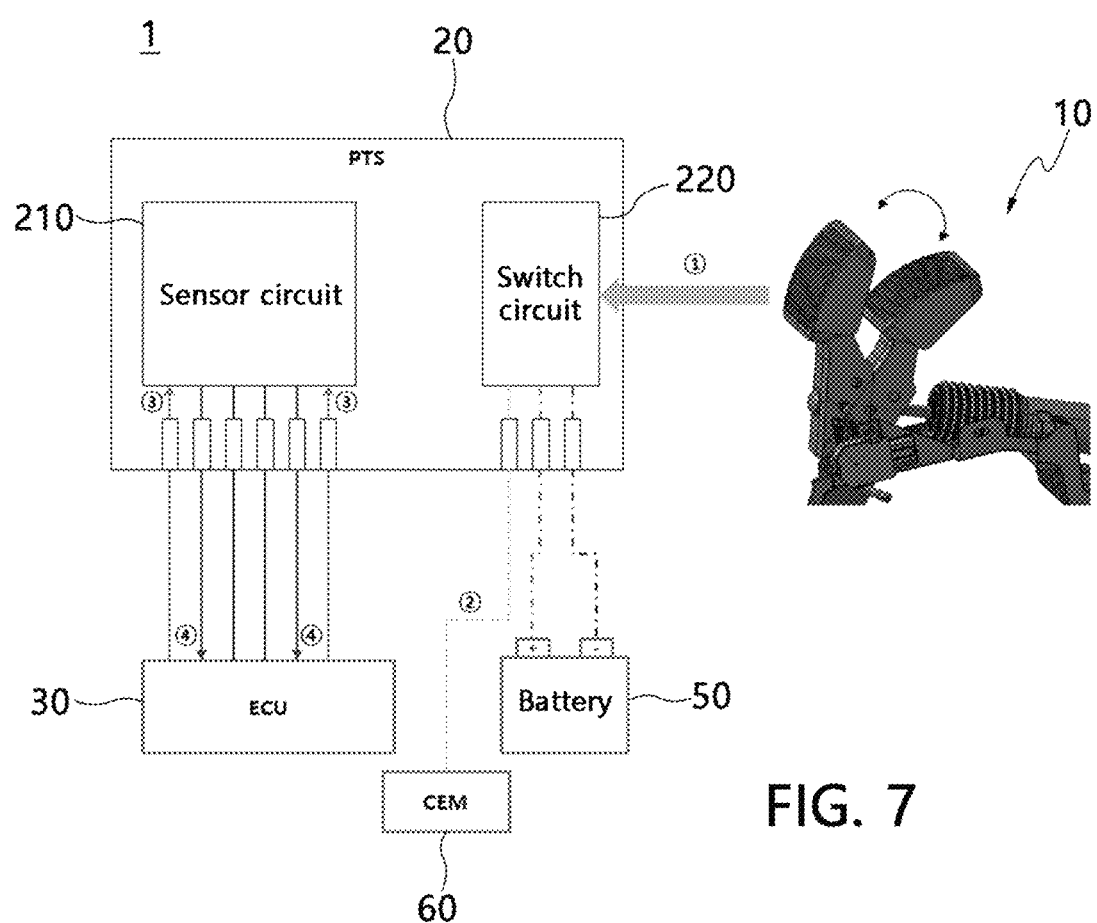
FIG. 7 is a conceptual diagram illustrating the coupling relationship between a PTS, an ECU, a battery and a CEM provided in the vehicle braking system of FIG. 6.
Figure 8:
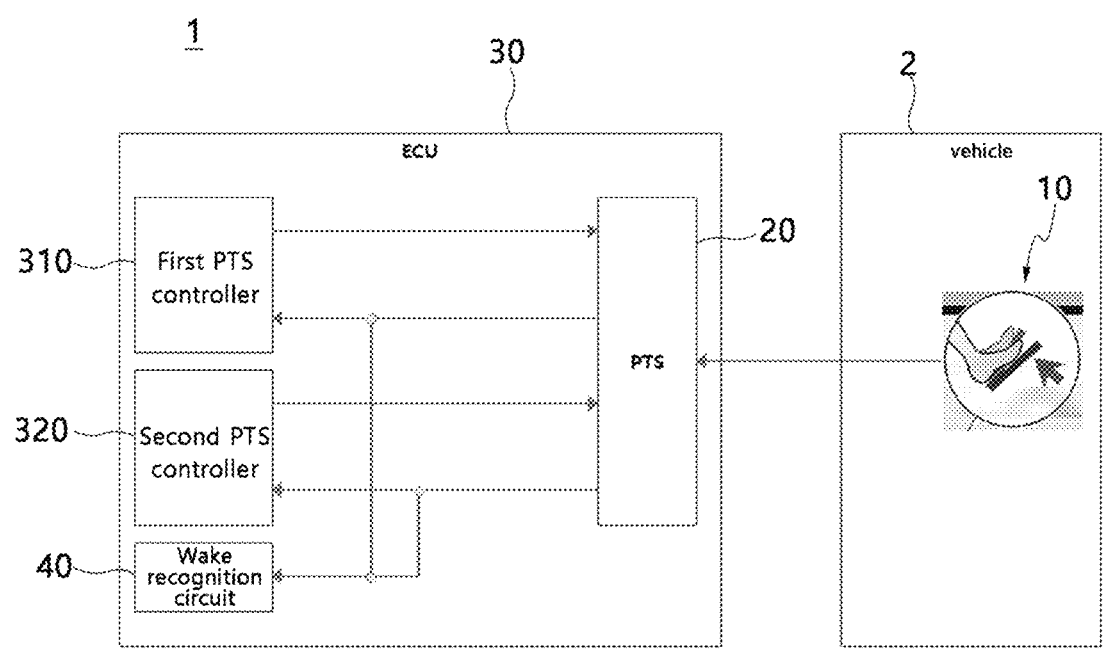
FIG. 8 is a conceptual diagram illustrating the vehicle braking system according to still another embodiment of the present disclosure.

As described above, the vehicle braking system 1 according to an exemplary embodiment of the present disclosure has been described. Hereinafter, the vehicle braking system 1 according to another exemplary embodiment of the present disclosure will be described with reference to FIGS. 6 to 7.

The function and structure of the vehicle braking system 1 according to the present exemplary embodiment corresponds to the vehicle braking system 1 according to the above-described exemplary embodiment. However, the vehicle braking system 1 according to the present exemplary embodiment is different from the vehicle braking system 1 according to the above-described exemplary embodiment in some components.

Specifically, the vehicle braking system 1 according to the present exemplary embodiment is different from the vehicle braking system according to the above-described exemplary embodiment in that the wake recognition circuit 40 is built in a central electronic module (CEM) 60 independent of the ECU 30.

Hereinafter, the vehicle braking system 1 according to the present exemplary embodiment will be described with a focus on differences from the vehicle braking system 1 according to the above-described exemplary embodiment.

The vehicle braking system 1 according to the present exemplary embodiment includes a pedal 10, a PTS 20, an ECU 30, a wake recognition circuit 40, a battery 50 and a CEM 60. Among the above components, the pedal 10 and the battery 50 of the present exemplary embodiment have the same structures, functions and combination structures as those of the above-described exemplary embodiment.

However, the PTS 20, the ECU 30, the wake recognition circuit 40 and the CEM 60 are different from the vehicle braking system 1 according to the above-described exemplary embodiment in some components.

The wake recognition circuit 40 is built in a central electronic module (CEM) 60 independent of the ECU 30. Accordingly, the switch circuit 220 of the PTS 20 is connected to the CEM 60 such that electricity can flow in both directions, rather than the ECU 30, and outputs a signal to the CEM 60.

In the present exemplary embodiment, a wake-up signal generation process when the pedal 10 is applied is as follows.

(1) When the pedal 10 is pressed in the ignition OFF state of the vehicle 2, the pedal 10 is rotated and the magnet 240 of the switch circuit 220 is rotated together. As the magnet 240 rotates, the magnetic strength in the switch circuit 220 changes. (2) The switch circuit 220 recognizes a change in magnetic strength of the magnet 240, and outputs a signal to the CEM 60. (3) When the CEM 60 receives a wake-up signal, the ECU 30 supplies power to the PTS 20. (4) The PTS 20 supplied with power transmits operation and output signals to the ECU 30.

In summary, after the wake recognition circuit 40 in the CEM 60 receives an output signal from the PTS 20, power is supplied from the ECU 30 to the PTS 20.

Accordingly, when the ignition of the vehicle 2 is in the OFF state, that is, in the parking state, the wake-up operation may be performed by a separate battery 50, and power to the ECU 30 is not required. Accordingly, the standby power of the ECU 30 may be further reduced. Furthermore, the efficiency of the ECU 30 may be further improved.

As described above, the vehicle braking system 1 according to another exemplary embodiment of the present disclosure has been described. Hereinafter, the vehicle braking system 1 according to still another exemplary embodiment of the present disclosure will be described with reference to FIGS. 8 to 11.

The function and structure of the vehicle braking system 1 according to the present exemplary embodiment correspond to those of the vehicle braking system 1 according to the above-described exemplary embodiment. However, the vehicle braking system 1 according to the present exemplary embodiment is different from the vehicle braking system 1 according to the above-described exemplary embodiment in some components.

Specifically, the vehicle braking system 1 according to the present exemplary embodiment is difference from the vehicle braking system 1 according to the above-described exemplary embodiment in that the PTS 20 and the pedal 10 are spaced apart from each other, that is, it is formed as a built-in type.

Hereinafter, the vehicle braking system 1 according to the present exemplary embodiment will be described with a focus on differences from the vehicle braking system 1 according to the above-described exemplary embodiment.

The vehicle braking system 1 according to the present exemplary embodiment includes a pedal 10, a PTS 20, an ECU 30 and awake recognition circuit 40. Among the above components, the pedal 10 of the present exemplary embodiment has the same structure, function and combination structure as that of the above-described exemplary embodiment.

However, the PTS 20, the ECU 30 and the wake recognition circuit 40 are different from the vehicle braking system 1 according to the above-described exemplary embodiment in some components.

The PTS 20 according to the present exemplary embodiment is spaced apart from the pedal 10. That is, it is formed as a built-in type.

Figure 9:
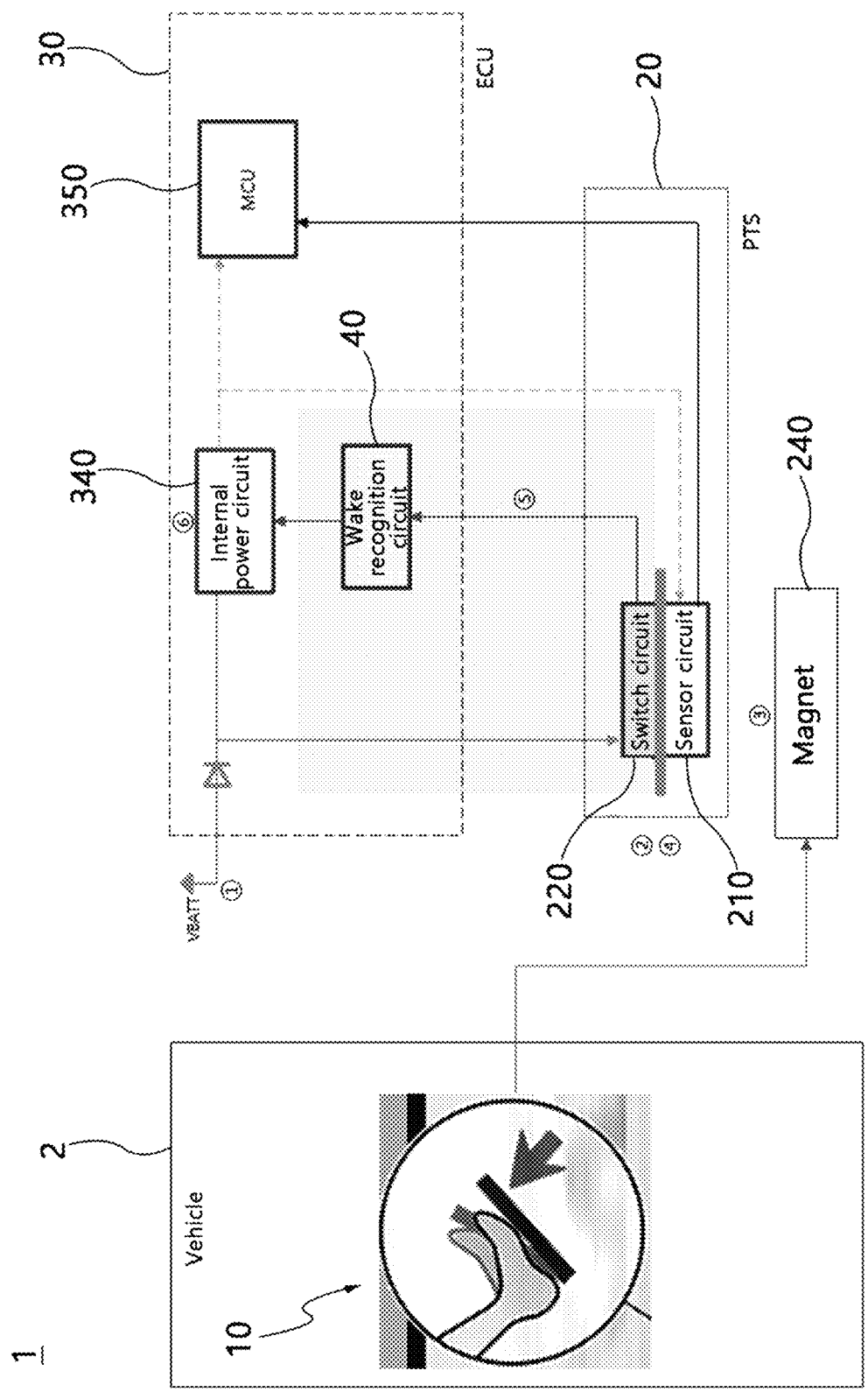
FIG. 9 is a conceptual diagram illustrating the coupling relationship between a PTS and an ECU included in the vehicle braking system of FIG. 8.

In the exemplary embodiment illustrated in FIG. 9, the PTS 20 includes a sensor circuit 210, a switch circuit 220 and a magnet 240. The switch circuit 220 detects a change in magnetic strength of the magnet 240, and outputs a signal to the wake recognition circuit 40 when the magnetic strength of the magnet 240 is at least a preset magnetic strength.

In the above exemplary embodiment, the ECU 30 further includes an internal power circuit 340 and a micro controller unit (MCU) 350, in addition to the first PTS controller 310 and the second PTS controller 320.

In the above exemplary embodiment, a wake-up signal generation process when the pedal 10 is applied is as follows.

(1) Power is always input to the internal power circuit 340 and the switch circuit 220 of the ECU 30. (2) Accordingly, the switch circuit 220 is always driven. (3) When the pedal 10 is pressed while the vehicle 2 is in the ignition OFF state, the pedal 10 is rotated and the magnet 240 of the PTS 20 is rotated together. As the magnet 240 rotates, the magnetic strength in the switch circuit 220 changes. (4) Through this, the switch circuit 220 recognizes a change in magnetic strength of the magnet 240. (5) The switch circuit 220 outputs a signal to the wake recognition circuit 40 based thereon. (6) The wake recognition circuit 40 transmits a wake-up signal to the internal power supply circuit 340 of the ECU 30. The internal power circuit 340 of the ECU 30 supplies power to the sensor circuit 210 of the MCU 350 and the PTS 20 after receiving the wake-up signal. The sensor circuit 210 supplied with power transmits operation and output signals to the ECU 30.

Figure 10:
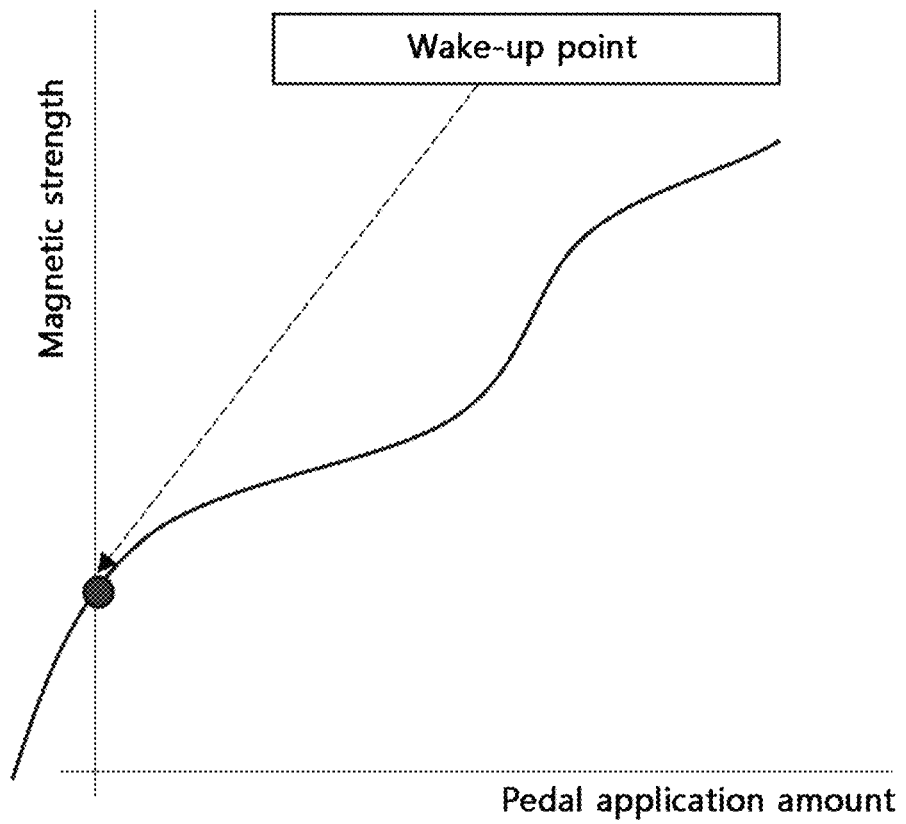
FIG. 10 is a conceptual diagram illustrating the wake-up sensing process according to a change in magnetic strength of the PTS of FIG. 9.

FIG. 10 illustrates a change in magnetic strength according to the amount of pressure being applied to the pedal 10. Herein, it is assumed that the magnetic strength of the magnet 240 when the pedal 10 is pressed is a wake-up point. When the magnetic strength of the magnet 240 reaches the wake-up point, the switch circuit 220 detects this and outputs a signal to the wake recognition circuit 40.

As described above, the wake recognition circuit 40 receives a signal and generates a wake-up signal in the ECU 30. In summary, when the magnetic strength of the magnet 240 increases above the wake-up point as the pedal 10 is pressed, the switch circuit 220 generates a wake-up signal to the ECU 30.

Figure 11:
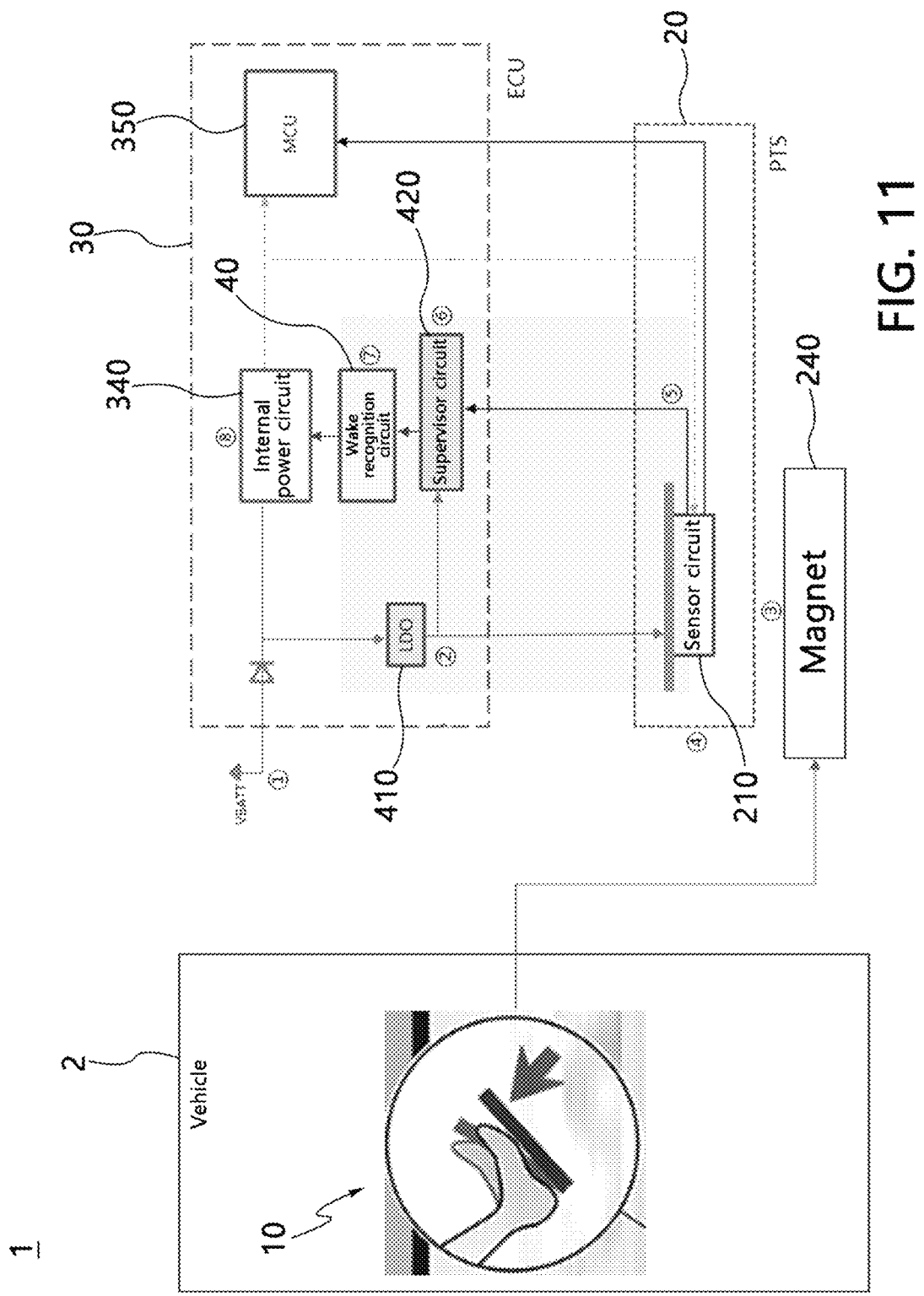
FIG. 11 is a conceptual diagram illustrating another exemplary embodiment of a PTS and an ECU provided in the vehicle braking system of FIG. 8.

In the exemplary embodiment illustrated in FIG. 11, the PTS 20 includes a sensor circuit 210 and a magnet 240. The sensor circuit 210 senses whether pressure is being applied to the pedal and the amount of pressure being applied based on the change in magnetic strength of the magnet 240. In addition, the sensor circuit 210 uses a pulse width modulation (PWM) signal as an output signal.

In the above exemplary embodiment, the wake recognition circuit 40 is connected to a low-dropout regulator (LDO) 410 and a supervisor circuit 420 for maintaining a constant circuit voltage. The supervisor circuit 420 is connected to the sensor circuit 210 such that electricity can flow in both directions so as to receive an output signal according to the sensing result of the sensor circuit 210. The supervisor circuit 420 monitors the output signal, and transmits it to the wake recognition circuit 40 when the output signal reaches a preset value.

In the above exemplary embodiment, a wake-up signal generation process when the pedal 10 is applied is as follows.

(1) Power is always input to the internal power circuit 340, the sensor circuit 210 and the supervisor circuit 420 of the ECU 30. (2) In this case, the power input to the sensor circuit 210 and the supervisor circuit 420 is input while maintaining a constant voltage by the LDO 410. (3) Accordingly, the sensor circuit 210 is always driven. (4) When the pedal 10 is pressed while the vehicle 2 is in the ignition OFF state, the pedal 10 is rotated and the magnet 240 of the sensor circuit 210 is rotated together. (5) The sensor circuit 210 outputs a signal to the supervisor circuit 420 based on the magnetic strength of the magnet 240, and the output signal is increased. (6) In this case, the supervisor circuit 420 recognizes an increase in the output signal of the sensor circuit 210. (7) The supervisor circuit 420 outputs a signal to the wake recognition circuit 40 based thereon. (8) The wake recognition circuit 40 transmits a wake-up signal to the internal power circuit 340 of the ECU 30. The internal power circuit 340 supplies power to the MCU 350 and the sensor circuit 210 after receiving the wake-up signal. The sensor circuit 210 supplied with power transmits operation and output signals to the supervisor circuit 420 and the ECU 30.

Although the above has been described with reference to the preferred exemplary embodiments of the present disclosure, the present disclosure is not limited to the configuration of the above-described exemplary embodiments.

In addition, the present disclosure can be variously modified and changed by those of ordinary skill in the art to which the present disclosure pertains without departing from the spirit and scope of the present disclosure as set forth in the claims below.

Furthermore, the exemplary embodiments may be configured by selectively combining all or part of each exemplary embodiment such that various modifications can be made.

1: Vehicle braking system
10: Pedal
20: Pedal travel sensor (PTS)
210: Sensor circuit
220: Switch circuit
230: Printed circuit board (PCB)
240: Magnet
250: Magnetic flux density plate
30: Electronic control unit (ECU)
310: First PTS controller
320: Second PTS controller
330: Regulator
340: Internal power circuit
350: Micro controller unit (MCU)
40: Wake recognition circuit
410: Low-dropout regulator (LDO)
420: Supervisor circuit
50: Battery
60: Central electronic module (CEM)
2: Vehicle

The invention claimed is:

1. A vehicle brake system, comprising:
a pedal travel sensor (PTS) configured to sense whether pressure is being applied to a pedal and an amount of the pressure being applied; and
an wake recognition circuit connected to the PTS such that electricity can flow directly in both directions, the wake recognition circuit configured to, in response to an output signal which is transmitted from the PTS to the wake recognition circuit if the output signal is greater than or equal to a preset value, wake up an electronic control unit, (ECU) if a vehicle is in an off state.

2. The vehicle brake system of claim 1, wherein the PTS transmits the output signal to the wake recognition circuit, maintains the output signal for a preset time and transmits the output signal to the wake recognition circuit.

3. The vehicle brake system of claim 1, wherein the wake recognition circuit is operated at all times by power.

4. The vehicle brake system of claim 1, wherein the PTS is directly interconnected with the pedal.

5. The vehicle brake system of claim 4, wherein the PTS is provided with a press switch for sensing whether pressure is being applied to the pedal and the amount of pressure being applied by coming into contact with the pedal, when the pedal is pressed and rotated.

6. The vehicle brake system of claim 5, wherein the PTS is connected to the power of the ECU such that electricity can flow directly in both directions so as to receive power at all times.

7. The vehicle brake system of claim 6, wherein the PTS is connected to a regulator of the ECU such that electricity can flow directly in both directions, and transmits the output signal to the regulator, if the output signal is at least a preset value, and
wherein the regulator wakes up by receiving the output signal.

8. The vehicle brake system of claim 4, wherein the PTS comprises:
a printed circuit board (PCB);
a magnet whose magnetic strength is changed as the pedal is pressed;
a sensor circuit disposed on one surface of the PCT and configured to sense whether pressure is being applied to the pedal and the amount of pressure being applied based on a change in the magnetic strength; and
a switch circuit for outputting a signal to the wake recognition circuit, if the change in magnetic strength is at least a preset change amount.

9. The vehicle brake system of claim 8, wherein the switch circuit is connected to a separate battery independent of the power of the ECU such that electricity can flow directly in both directions so as to receiver power at all times.

10. The vehicle brake system of claim 9, wherein the wake recognition circuit is built in a central electronic module (CEM) independent of the ECU, and
wherein the ECU supplies power to the PTS, when the wake recognition circuit receives the output signal from the PTS.

11. The vehicle brake system of claim 8, wherein the switch circuit is disposed on the one surface of the PCB.

12. The vehicle brake system of claim 8, wherein the switch circuit is disposed on the other surface opposite to the one surface of the PCB.

13. The vehicle brake system of claim 1, wherein the PTS is spaced apart from the pedal.

14. The vehicle brake system of claim 13, wherein the PTS comprises:
a printed circuit board (PCB);
a magnet whose magnetic strength is changed as the pedal is pressed;
a sensor circuit disposed on one surface of the PCT and configured to sense whether pressure is being applied to the pedal and the amount of pressure being applied based on a change in the magnetic strength; and
a switch circuit for outputting a signal to the wake recognition circuit, if the change in magnetic strength is at least a preset change amount.

15. The vehicle brake system of claim 13, wherein the output signal of the PTS is a pulse width modulation (PWM) signal, and
wherein the wake recognition circuit comprises a supervisor circuit for monitoring the PWM signal, and transmitting the PWM signal to the wake recognition circuit, when the PWM signal reaches a preset value.

* * * * *